United States Patent [19]

Cantarutti

[11] 3,944,456

[45] Mar. 16, 1976

[54] TIRE BUILDING MACHINE

[75] Inventor: Armindo Cantarutti, Akron, Ohio

[73] Assignee: NRM Corporation, Akron, Ohio

[22] Filed: May 6, 1974

[21] Appl. No.: 467,382

[52] U.S. Cl. .................. 156/398; 156/132; 156/401
[51] Int. Cl.² .................... B29H 17/12; B29H 17/22
[58] Field of Search ............ 156/110, 123, 131–133, 156/394, 398–403, 414–420

[56] References Cited
UNITED STATES PATENTS

| | | | |
|---|---|---|---|
| 2,614,952 | 10/1952 | Kraft | 156/416 |
| 2,878,856 | 3/1959 | Pacciarini et al. | 156/400 |
| 3,244,575 | 4/1966 | Sabo et al. | 156/132 |
| 3,434,897 | 3/1969 | Caretta et al. | 156/132 |
| 3,438,832 | 4/1969 | Cantarutti | 156/132 |
| 3,721,600 | 3/1973 | Cantarutti | 156/132 |
| 3,740,293 | 6/1973 | Jones et al. | 156/132 |

FOREIGN PATENTS OR APPLICATIONS

| | | | |
|---|---|---|---|
| 628,631 | 1961 | Canada | 156/394 |

*Primary Examiner*—William A. Powell
*Assistant Examiner*—John E. Kittle
*Attorney, Agent, or Firm*—Donnelly, Maky, Renner & Otto

[57] ABSTRACT

Tire building machine includes a pair of carriages axially movable in unison toward and away from opposite ends of the tire building drum on which are mounted bead carriers for supporting tire beads radially outwardly of the drum ends. Suitable controls and adjustments are provided for moving the carriages symmetrically about the center line of the drum into precise positions for positioning the tire beads with precision over the ends of the drum and holding the tire beads in place during expansion of the drum. Pusher rings may also be provided on the carriages to assist in obtaining symmetrical movement of the ply turnup bladders for obtaining the same amount of stitching and turnup of the plies on both sides of the tire.

15 Claims, 10 Drawing Figures

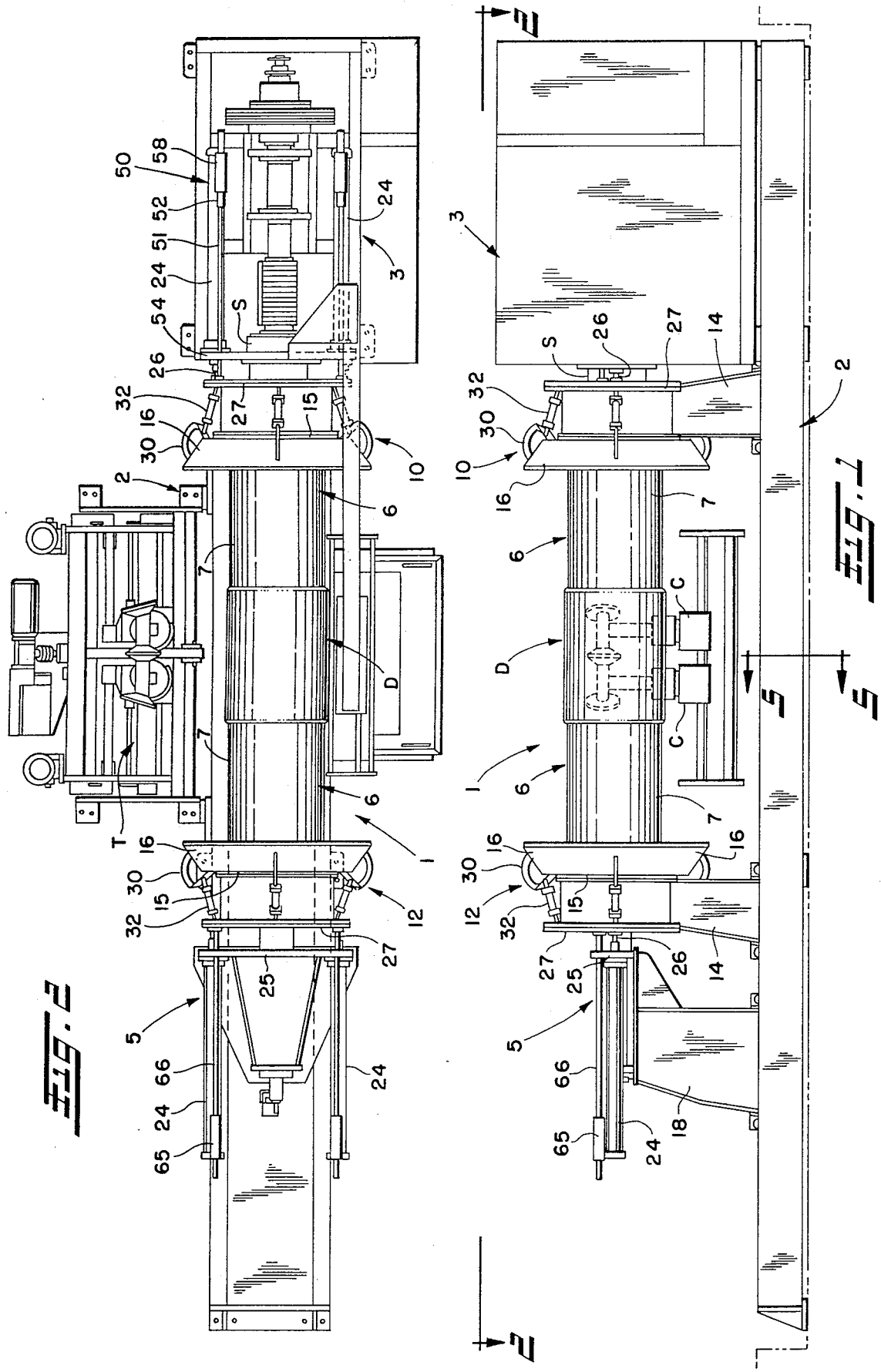

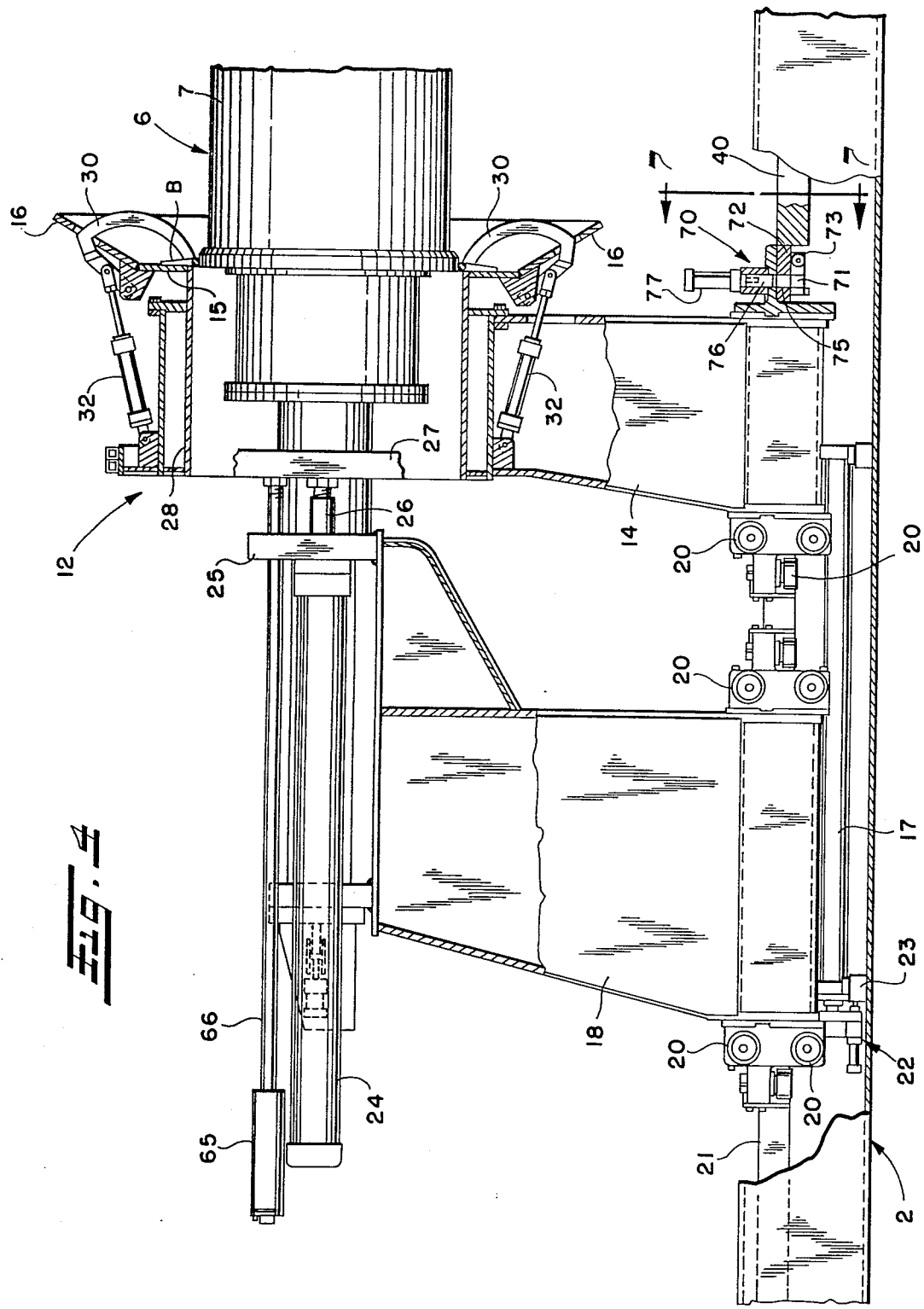

TIRE BUILDING MACHINE

BACKGROUND OF THE INVENTION

This invention relates generally as indicated to a tire building machine, and more particularly, to certain improvements in tire building machines for positioning the tire beads with precision over both ends of the tire building drum and holding such beads in place during radial expansion of the drum.

In the manufacture of certain types of tires, it is conventional practice to position the tire beads axially and radially over the ends of the tire building drum after the tire plies have been applied to the drum, followed by radial expansion of the drum to expand the tire plies into engagement with the inner diameter of the tire beads as described and shown, for example, in FIGS. 6 and 7 of U.S. Pat. No. 3,721,600, granted to Armindo Cantarutti on Aug. 19, 1970, which is incorporated herein by way of reference.

For precision tire making, it is essential that both tire beads be moved symmetrically about the center line of the tire building drum into the precise positions over the ends of the drum and held in place during expansion of the drum. It is also important in the manufacture of precision tires to obtain the same amount of stitching and turnup of the plies on each side of the tire.

Precise positioning of the tire beads is obtained in accordance with the present invention by providing carriages for the tire beads adjacent both ends of the tire building drum whose movements are controlled by a rack and pinion mechanism including controls and adjustments which cause the carriages to move symmetrically about the center line of the drum to position the tire beads precisely over the ends of the drum where they are held in place during expansion of the drum. The carriages may also include pusher rings and the like to assist in obtaining symmetrical movement of the ply turnup bladders for effecting the same amount of stitching and turnup of the plies on each side of the tire.

It is generally known to use racks and pinions to actuate bead carriers and move the tire beads into engagement with the ends of a tire building drum, but not in conjunction with the controls and adjustments necessary to obtain precise positioning and retention of the tire beads axially over the ends of the drum rather than against the ends of the drum for building a precision tire.

SUMMARY OF THE INVENTION

It is accordingly a principal object of this invention to provide a tire building machine in which the tire bead carriers are moved symmetrically about the center line of the drum to position the tire beads precisely over the ends of the drum and retained in place during expansion of the drum.

Another object is to provide such a tire building machine in which the movements of the tire bead carriers are controlled by a rack and pinion mechanism including controls and adjustments for precise positioning and retention of the tire beads over the ends of the drum.

Still another object is to provide such a tire building machine in which the same amount of stitching and turnup of the plies is obtained on each side of the tire.

These and other objects of the present invention are achieved utilizing a rack and pinion mechanism for controlling the movements of the tire bead carriers toward and away from opposite ends of the drum. The tire bead carriers support the tire beads radially outwardly of the drum ends, and suitable controls and adjustments are provided for moving the tire bead carriers symmetrically about the center line of the drum into precise positions for positioning the tire beads with precision over the ends of the drum and holding the tire beads in place during expansion of the drum. Pusher rings and the like may also be provided on the carriages for the tire bead carriers to assist in obtaining symmetrical movement of the ply turnup bladders for effecting the same amount of stitching and turnup of the plies on both sides of the tire through synchronous movement of the carriages inward towards the bladders at the same time and at the same distance from the tire.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a front elevation view of a preferred form of tire building machine constructed in accordance with this invention;

FIG. 2 is a top plan view of the tire building machine of FIG. 1 as seen from the plane of the line 2—2 thereof;

FIG. 4 is an enlarged partial longitudinal section through the tailstock assembly at the left end of the tire building machine;

DESCRIPTION OF THE PREFERRED EMBODIMENT

Figure 3:
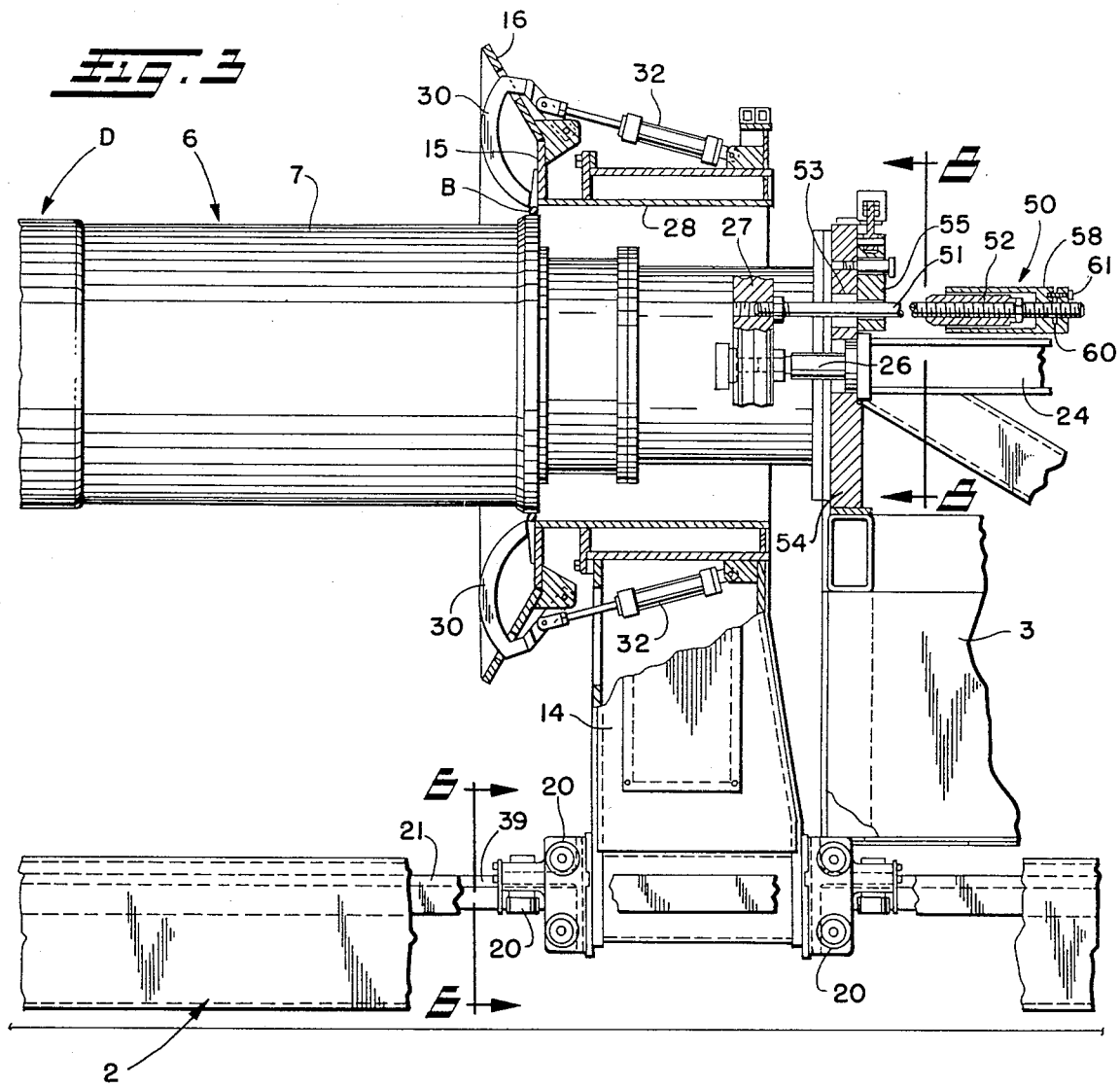
FIG. 3 is an enlarged fragmentary longitudinal section through a portion of the headstock assembly at the right end of the tire building machine of FIGS. 1 and 2.

In FIGS. 1 and 2 a preferred form of a tire building machine in accordance with this invention is generally indicated by the reference numeral 1 and includes a main base assembly 2 on which is mounted a main housing 3 at one end containing the drive mechanisms and necessary controls for operating the machine as required. An expandable tire building drum D is mounted on a tire drum shaft S projecting outwardly from the main housing 3 toward the outboard end 5 of the tire building machine. The tire building drum D may be of the usual collapsible type to permit removal of the finished tire carcass therefrom, and a pair of tread stitcher assemblies T may be mounted on carriages C at the rear of the machine for longitudinal movement toward and away from each other for stitching of the tire plies in place on the drum in conventional manner.

Associated with each end of the drum D is a ply turn-up mechanism 6 which may be of the type shown and described in U.S. Pat. No. 3,721,600, incorporated herein by way of reference, including an inflatable annular air bag or bladder 7 supported in a substantially flattened condition by an outer shell when the bladder is deflated as shown in FIGS. 1 and 2. Also mounted adjacent opposite ends of the tire building drum D are inboard and outboard assemblies 10 and 12 each including a carriage 14 on which are mounted a tire bead carrier 15 and bladder pusher ring 16. Both carriages 14 are mounted for movement in unison symmetrically about the center line of the drum D to permit the tire beads B to be precisely positioned over the ends of the drum and held in place during expansion of the drum in a manner to be fully described hereafter. In addition, the entire outboard assembly 12, including its associated carriage 14, is mounted for movement toward and away from the adjacent end of the drum to permit the finished tire carcass to be removed from the machine and the tire beads to be placed on the tire bead carriers of both the inboard and outboard assemblies for use in making the next tire carcass. Otherwise, the details of construction and operation of the inboard and outboard assemblies 10 and 12 are substantially the same, and the same reference numerals are used to identify the same parts.

As best seen in FIGS. 1, 2 and 4 the outboard assembly 12 includes, in addition to the movable carriage 14 for the tire bead carrier 15 and pusher ring 16, a second carriage 18 for supporting the tailstock shaft assembly which has a drum flange on the axial inner end thereof engageable with the outboard end of the tire building drum. The drum flange is located radially inwardly of the tire bead carrier 15, and may be removed and replaced in conventional manner for making different sized tires as desired. Both outboard asssembly carriages 14 and 18 include suitable guide rollers 20 for supporting the carriages for movement along a pair of guide rails 21 extending along the length of the main base member 2 parallel to the axis of the tire building drum D. Simultaneous movement of both outboard assembly carriages 14 and 18 toward and away from the adjacent end of the drum D may be obtained by actuation of a pneumatic cylinder 19 (see FIG. 4), or a rack suitably connected to the carriage 18 and engaged by a motor driven pinion may be provided for that purpose. An adjustable stop 22 may also be provided on the carriage 18 for engagement with a fixed stop 23 on the main base member 2 as further shown in FIG. 4 for limiting axial inward movement of the carriage 18 relative to the tire building drum D to accurately locate the drum flange with respect to the outboard end of the drum.

Additional movement of the carriage 14 for the outboard tire bead carrier 15 and pusher ring 16 relative to the carriage 18 may be obtained by providing a pair of large tandem cylinders 24 fixed to a support flange 25 on the carriage 18, one on each side of the machine. The rods 26 for the tandem cylinders 24 are suitably fastened to a plate 27 attached to the outer surface of an annular support ring 28 for the outboard tire bead carrier 15 for movement of the tire bead carrier and associated carriage 14 toward and away from the carriage 18 upon actuation of the tandem cylinders.

The inboard assembly carriage 14 is also supported on the guide rails 21 by a plurality of support rollers 20 as shown in FIG. 3 for movement therealong toward and away from the adjacent end of the tire building drum D upon actuation of a pair of large tandem cylinders 24 mounted on the main drive housing 3 with their rods 26 suitably connected to the annular support ring 28 for the tire bead carrier 15.

Figure 9:
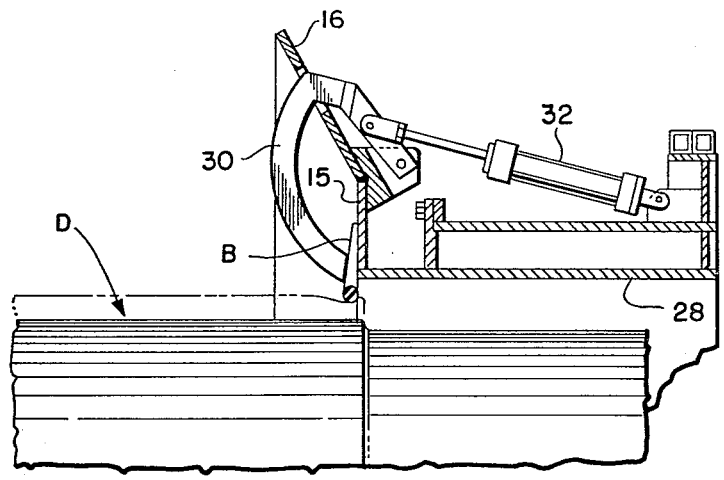
FIGS. 9 and 10 are fragmentary schematic longitudinal sections illustrating certain steps in the preferred sequence of operation of the tire building machine of the present invention during the manufacture of a tire carcass.

The inner diameter of the annular support ring 28 for both tire bead carriers 15 is somewhat larger than the outer diameter of the tire building drum D when in the unexpanded or retracted condition shown in FIGS. 3 and 9 to permit the tire bead carriers 15 to be moved axially inwardly over the ends of the tire building drum D for accurate positioning of the tire beads B radially over the ends of the drum. The tire beads B may be secured in place against the tire bead carriers 15 for movement therewith by providing a plurality of circumferentially spaced pivotally mounted jaws 30 on the tire bead carriers which are moved into and out of clamping engagement with the long flippers on the tire beads upon actuation of a plurality of hydraulic cylinders 32 associated therewith.

To insure positioning of the tire beads B with precision over the ends of the drum D, a rack and pinion mechanism 35 is provided for synchronously moving the inboard and outboard carriages 14 for the bead ring carriers 15 symmetrically about the center line of the drum. As clearly shown in FIG. 5, such rack and pinion mechanism 35 includes a housing 36 located between the guide rails 21 intermediate the ends thereof in which is mounted a pinion 37 rotatable about a pinion shaft 38 whose axis is located on the center line of the carriages 14. Engaging the pinion 37 on opposite sides thereof are a pair of racks 39 and 40. One of the racks 39 extends axially outwardly from one end of the housing 36 for connection to the inboard assembly carriage 14, and the other rack 40 extends axially outwardly from the other end of the housing for connection to the outboard assembly carriage 14, whereby actuation of the hydraulic cylinders 24 will cause the inboard and outboard assembly carriages 14 to move axially toward and away from each other to the same extent. While two sets of hydraulic cylinders 24 are shown, one for actuating each of the carriages 14, it will be apparent that the hydraulic cylinders for actuating the inboard assembly carriage could be eliminated and actuation of the hydraulic cylinders for the outboard assembly carriage would cause a corresponding movement of the inboard assembly carriage through rotation of the pinion 37 which causes the rack 39 for the inboard assembly carriage to move axially to the same extent as the rack 40 for the outboard assembly carriage but in the opposite direction.

Figure 5:
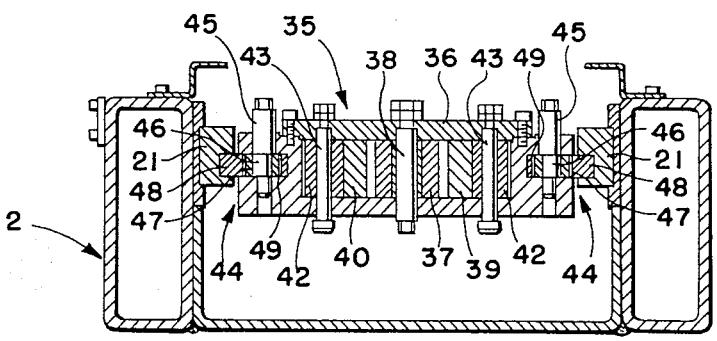
FIG. 5 is an enlarged transverse section through the central portion of the main base assembly for the tire building machine, taken on the plane of the line 5—5 of FIG. 1.

Backup rolls 42 mounted on shafts 43 in the housing 36 engage the back sides of the racks 39 and 40 to maintain the racks in proper meshing engagement with the pinion 37, and suitable mechanism 44 is also desirably provided for moving the entire housing 36 laterally with respect to the guide rails 27 to insure proper axial alignment of the pinion 37 with respect to the center line of the carriages 14. As shown in FIG. 5, such mechanism 44 may consist of rotatable pins 45 adjacent each side of the housing 36 having eccentrics 46 thereon. The eccentrics 46 are received in bushings 47 carried by mounting plates 48 extending from the sides of the base member 2 into slots 49 in the housing 36. As apparent, rotation of the pins 45 will cause the eccentrics 46 to rotate, forcing the housing 36 laterally.

Preferably, potentiometer type electrical hydraulic controls are provided for controlling the actuation of the hydraulic cylinders 24 for moving the carriages 14 toward each other symmetrically about the center line of the drum D into position for locating the tire beads B with precision radially outwardly over the ends of the drum and holding the beads in place during expansion of the drum. A mechanical stop 50 is also desirably provided on the inboard assembly carriage 14 for limiting the inward movement of both carriages 14 for accurate bead set to insure safe and controlled operation of the machine in the event that the hydraulic controls do not function properly.

Figure 8:
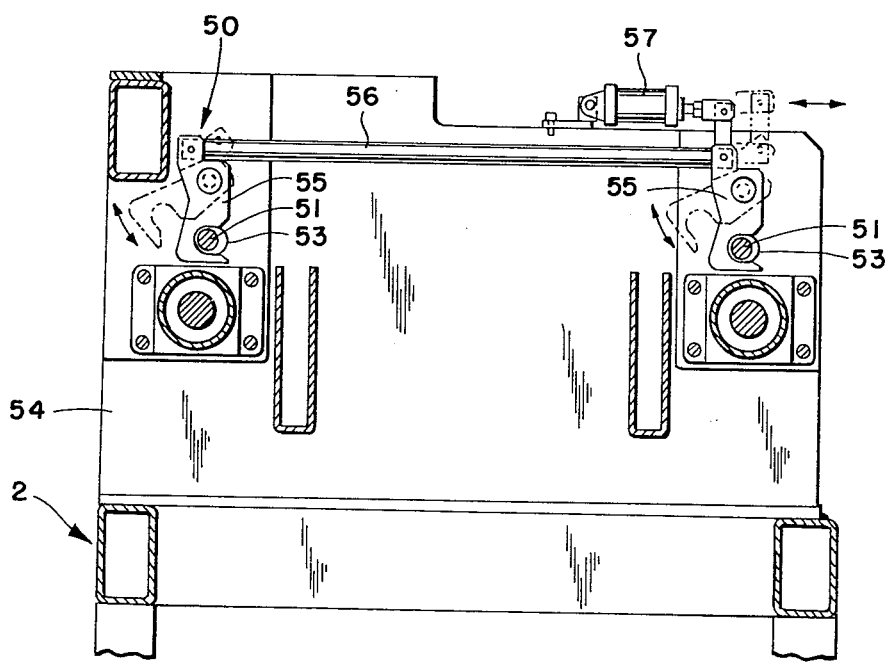
FIG. 8 is a fragmentary transverse section through the headstock assembly of FIG. 3, taken on the plane of the line 8—8 thereof.

As best seen in FIGS. 3 and 8, the mechanical stop 50 desirably consists of a pair of longitudinally extending, laterally spaced rods 51 having their inner ends suitably attached to the plate 27 connected to the annular support ring 28 for the inboard assembly carriage 14 on opposite sides thereof and having adjustable nuts 52 threaded onto the outer ends of the rods. The rods 51 extend through enlarged openings 53 in a stationary mounting plate 54 on the main housing 3. The openings 53 in the stationary mounting plate 54 are preferably of a diameter somewhat greater than the outer diameter of the stop nuts 52 to permit continued axial inward movement of the carriages 14 beyond the bead setting position during ply turnup in a manner to be subsequently described. However, during bead set, a pair of gates 55 pivotally mounted on the back side of the stationary mounting plate 54 are swung into position behind the enlarged openings 53 to limit axial inward movement of the carriages 14 to the bead setting position upon engagement of the stop nuts 52 with the gates. Actuation of the gates 55 may be obtained as by providing an actuating rod 56 extending between the two gates, and an actuating cylinder 57 suitably connected to the actuating rod 56 for moving the actuating rod back and forth to cause the gates 55 to rotate about their respective pivots between the solid and phantom line positions shown in FIG. 8.

With the gates 55 swung out of the way as shown in phantom lines in FIG. 8, the carriages 14 are free to be moved axially inwardly toward each other to a greater extent as determined by engagement of a further safety stop 58 on the stop rods 51 with the stationary mounting plate 54. The safety stops 58, like the stop nuts 52, are also threadedly received on the outer ends of the stop rods 51 to permit adjustment to be made, and the safety stops 58 are desirably recessed to permit extension of the outer ends of the stop nuts 52 into the safety stops. The outer ends of the safety stops 58 may also be transversely slotted at 60 and provided with screws 61 extending axially through the outer ends of the safety stops and slots to permit contraction and expansion of the slots for locking and unlocking the safety stops on the stop rods.

Similar safety stops 65 may also be provided on stop rods 66 extending outwardly from the annular support ring 27 of the outboard assembly carriage 14 as shown in FIGS. 1, 2 and 4 to protect the drum D from being damaged by excessive axial inward movement of the carriages toward the respective ends of the drum. The stop rods 66 on the outboard assembly carriage 14 extend through openings in the mounting plate 25 on the shaft assembly carriage 18 which are of a diameter somewhat less than the diameter of the safety stops 65 to limit axial inward movement of the safety stops 65 beyond the mounting plate 25.

Figure 6:
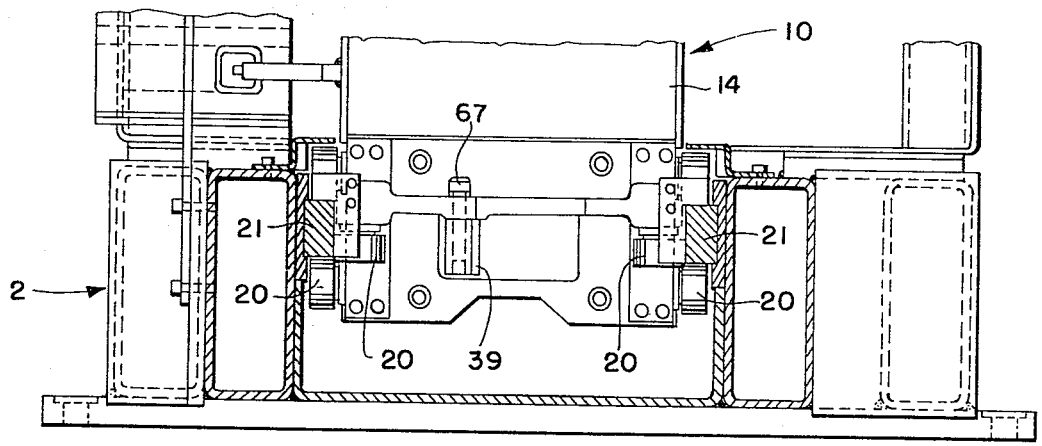
FIG. 6 is an enlarged transverse section through the main base assembly adjacent the inner end of the movable headstock assembly carriage for one of the tire bead carriers as seen from the plane of the line 6—6 of FIG. 3.
Figure 7:
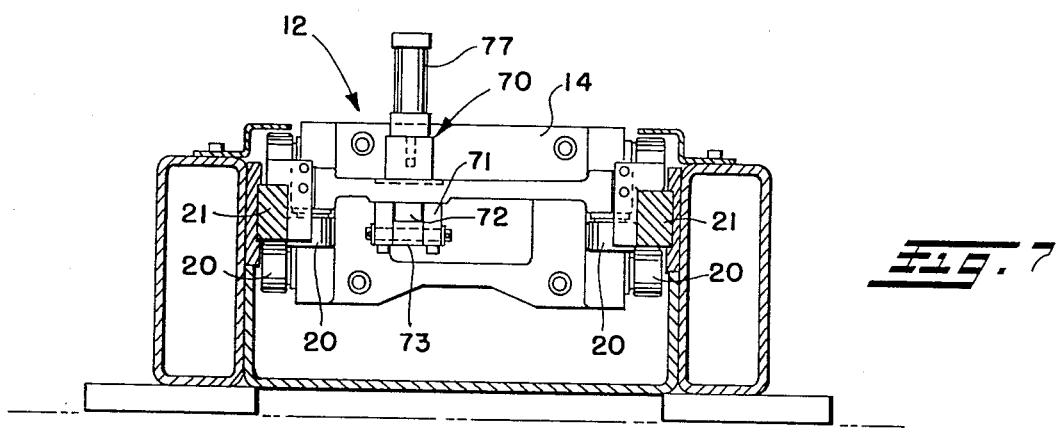
FIG. 7 is a fragmentary transverse section showing the releasable connection between the rack and movable tailstock assembly carriage for the other tire bead carrier as seen from the plane of the line 7—7 of FIG. 4.

The end of the rack 39 which is connected to the inboard assembly carriage 14 may be connected thereto in any convenient manner, as by pinning the end of the rack to the inboard assembly carriage 14 as shown at 67, in FIG. 6. However, the particular connection 70 between the end of the rack 40 and the outboard assembly carriage 14 must be one that will permit the outboard assembly carriage 14 to be released from the rack 40 prior to retraction of the entire outboard assembly 12 axially away from the adjacent end of the drum D for placement of the tire beads B on the tire bead carriers 15 and removal of the finished tire carcass from the tire building drum. As shown in FIGS. 4 and 7, such releasable connection 70 between the rack 40 and outboard assembly carriage 14 may consist of a yoke 71 for receipt of a reduced end portion 72 on the rack 40, with a roller 73 extending between the arms of the yoke for engaging the bottom surface of such reduced end portion. The reduced end portion 72 of the rack 40 has an aperture 75 therein which is in alignment with a pin 76 on the outboard assembly carriage 14 when the end portion 72 of the rack is properly positioned in the yoke 71. The pin 76 may be moved into and out of the aperture 75 in the rack for locking and releasing the carriage 14 from the rack 40 as by actuation of a fluid cylinder 77 to which the pin 76 is connected.

OPERATION

Now that the various parts of the tire building machine 1 have been described, a typical sequence of operation will now be set forth. Initially the tire building drum D is collapsed and the outboard assembly carriage 14 is disconnected from the associated rack 40 to permit the entire outboard assembly 12 to be moved axially away from the adjacent end of the drum for placement of the tire beads B on the tire bead carriers 15 of both inboard and outboard assembly carriages. Next the entire outboard assembly 12 is returned to the FIG. 4 position with the drum flange against the end of the drum, and the outboard assembly carriage 14 is once again attached to the associated rack 40 by actuation of the fluid cylinder 77 causing the pin 76 to extend into the aperture 75 in the rack end portion 72.

The tire building drum D is then rotated with the drum still contracted and the annular bladders 7 deflated to apply the tire plies to the drum with the edges of the plies protruding beyond the ends of the drum for engagement with the bladder. After the desired number of tire plies have been wrapped about the drum, the hydraulic cylinders 24 are actuated to cause the carriages 14 to move symmetrically about the center line of the drum to position the tire beads B with precision radially over the ends of the drum as schematically shown in FIG. 9, such movements of the carriages 14 being synchronized through movements of the racks 39 and 40 and pinion 37 as previously described. Then the drum segments are expanded to cause the tire plies to expand into engagement with the inner diameter of the tire beads B as shown in phantom lines in FIG. 9.

Figure 10:
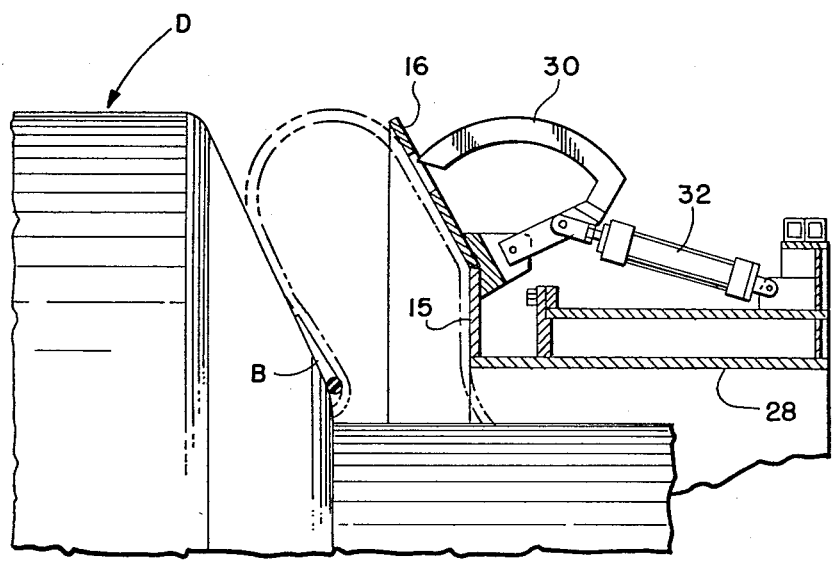

Following expansion of the drum D to the phantom line position shown in FIG. 9, the bead clamps 30 are retracted to release the tire beads B, after which the carriages 14 are retracted and the bladders 7 are inflated to cause the edges of the tire plies to be wrapped about the beads B and pressed against the top of the drum which may be expanded further as shown schematically in FIG. 10. During expansion of the bladders 7, the hydraulic cylinders 24 are again actuated to cause the carriages 14 to be moved axially inwardly for pressing against the bladders 7 by the pusher rings 16 which aid in causing the bladders to roll over and press the edges of the plies against the outer surface of the drum.

Because the movements of the two carriages 14 are symmetrical about the center line of the drum and move toward the bladders 7 at the same time and at the same distance from the tire, the same amount of stitching and turnup of the plies is obtained on each side of the tire. During ply turnup, the gates 55 are retracted to permit the carriages 14 to move axially inwardly beyond the bead set positions, but such continued axial inward movement is limited by the safety stops 58 and 65 to protect the drum against damage as aforesaid.

Upon completion of the ply turnup operation, the bladders 7, which may be of the type shown in U.S. Pat. No. 3,721,600 incorporated herein by way of reference, are deflated to permit the bladders to roll back and resume their flattened condition shown in FIG. 9. Additional tire plies may then be added as desired, and the tire tread stock and other materials are then applied to the tire carcass, after which the drum is collapsed and the outboard assembly 12 is retracted to permit removal of the finished tire carcass from the machine and placement of additional tire beads on the tire bead carriers 15 preparatory to making the next tire carcass.

From the foregoing, it will now be apparent that the tire building machine of the present invention assures accurate positioning of the tire beads precisely at the desired positions over the ends of the drum and retention of the tire beads in place during expansion of the drum. In addition, the tire building machine assures that the same amount of stitching and turnup of the tire plies will be obtained on each side of the tire, and suitable mechanism is also provided for protecting the tire building drum against damage.

The embodiments of the invention in which an exclusive property or privilege is claimed are defined as follows:

1. In a tire building machine, an expandable tire building drum having tire bead carriers mounted for movement toward and away from opposite ends of said drum, means for expanding and contracting said drum, said tire bead carriers including means for supporting the tire beads radially outwardly of the drum ends when the drum is contracted, and means for synchronously moving said tire bead carriers symmetrically about the centerline of said drum to position the tire beads at the desired location over the ends of said drum and holding the tire beads in place during expansion of said drum, said means for synchronously moving said tire bead carriers symmetrically about the centerline of said drum comprising a pair of carriages for said tire bead carriers, means mounting said carriages for movement toward and away from opposite ends of said drum, a rack and pinion mechanism for synchronizing the movements of said carriages in opposite directions, and control means for moving said carriages to the desired extent for positioning the tire beads at the desired location over the ends of said drum and holding the tire beads in place during expansion of said drum as aforesaid, said rack and pinion mechanism comprising a stationary housing located intermediate said carriages, a pinion rotatably mounted in said housing, and a pair of racks engaging opposite sides of said pinion, one of said racks being connected to one of said carriages and the other of said racks being connected to the other of said carriages for causing said carriages to move axially toward and away from each other to the same extent, one of said carriages being part of an inboard assembly at one end of said drum and the other of said carriages being part of an outboard assembly at the other end of said drum, means providing a releasable connection between said other carriage and its associated rack, and means for moving said other carriage toward and away from the adjacent end of said drum when said other carriage is disconnected from its associated rack to permit placement of the tire beads on said tire bead carriers and removal of the finished tire carcass from said tire building drum, said means providing a releasable connection between said other carriage and its associated rack comprising a yoke on said other carriage for receipt of a reduced end portion on its associated rack, a roller extending between the arms of said yoke for engaging the bottom surface of said reduced end portion, an aperture in said reduced end portion, and a pin on said carriage movable into and out of said aperture in said reduced end portion for locking and releasing said other carriage from its associated rack.

2. The machine of claim 1 further comprising mechanical stop means on at least one of said carriages for limiting inward movement of both of said carriages for accurate bead set.

3. The machine of claim 1 wherein said means for supporting the tire beads on said tire bead carriers comprises a plurality of circumferentially spaced pivotally mounted jaws on said tire bead carriers, and means for moving said jaws into and out of clamping engagement with the tire beads.

4. The machine of claim 1 wherein said outboard assembly includes a further carriage for supporting a tailstock shaft assembly, said further carriage being simultaneously movable with said other carriage toward and away from the adjacent end of said drum when said other carriage is disconnected from its associated rack as aforesaid, said other carriage also being axially movable relative to said further carriage.

5. The machine of claim 4 further comprising safety stop means on said outboard assembly to protect said drum from being damaged by excessive axial inward movement of said first-mentioned carriages toward the respective ends of said drum.

6. The machine of claim 5 wherein said safety stop means comprises a pair of laterally spaced longitudinally extending stop rods having their inner ends connected to said tire bead carrier of said outboard assembly, said stop rods extending through openings in a mounting plate on said further carriage, and safety stops on the other ends of said stop rods, said openings in said mounting plate being of a diameter somewhat less than the diameter of said safety stops to limit axial inward movement of said safety stops beyond said mounting plate.

7. The machine of claim 5 further comprising an adjustable stop on said further carriage engageable with a fixed stop on said machine for limiting axial inward movement of said further carriage relative to said drum.

8. The machine of claim 1 further comprising a ply turnup mechanism associated with each end of said drum, each said ply turnup mechanism comprising an annular inflatable bladder, means for supporting said bladder in substantially flattened condition adjacent the respective ends of said drum when said bladder is deflated, and means for inflating said bladder to cause the edges of the tire plies to be turned up over the tire beads after the tire beads have been precisely positioned over the ends of the drum and the drum has been expanded into engagement with the tire beads.

9. In a tire building machine, an expandable tire building drum having tire bead carriers mounted for movement toward and away from opposite ends of said drum, means for expanding and contracting said drum, said tire bead carriers including means for supporting the tire beads radially outwardly of the drum ends when the drum is contracted, and means for synchronously moving said tire bead carriers symmetrically about the centerline of said drum to position the tire beads at the desired location over the ends of said drum and holding the tire beads in place during expansion of said drum, and mechanical stop means provided on one of said carriages for limiting inward movement of said carriages for accurate bead set, said mechanical stop means comprising at least one longitudinally extending rod having its inner end attached to said tire bead carrier of said one carriage, adjustable stop nut means threaded onto the outer end of said rod, and gate means mounted for movement into and out of the path of said stop nut means for limiting axial inward movement of said carriages to the bead setting position upon engagement of said stop nut means with said gate means.

10. The machine of claim 9 wherein there are a pair of said longitudinally extending rods having their inner ends attached to said tire bead carrier of said one carriage, adjustable stop nut means threaded onto the outer ends of both said rods, and a pair of gate means mounted for movement into and out of the path of said stop nut means for limiting axial inward movement of said carriages to the bead setting position upon engagement of said stop nut means with said gate means, said gate means being mounted for pivotal movement, an actuating rod extending between said gate means, and an actuating cylinder connected to said actuating rod for moving said actuating rod back and forth which causes said gate means to rotate about their respective pivots.

11. The machine of claim 9 further comprising a ply turnup mechanism associated with each end of said drum, said gate means being pivotally mounted on the back side of a stationary mounting plate having an enlarged opening therein through which said rod extends, said enlarged opening on said stationary mounting plate being of a diameter somewhat greater than the outer diameter of said stop nut means to permit continued axial inward movement of said carriages beyond the bead setting position during ply turnup when said gate means is moved out of the path of said stop nut means, said rod having a further safety stop thereon axially outwardly of said stop nut means for engagement with said stationary mounting plate to limit such continued axial inward movement of said carriages during ply turnup.

12. The machine of claim 11 wherein said safety stop is adjustable along the length of said rod and recessed to permit extension of the outer end of said stop nut means into said safety stop.

13. The machine of claim 11 wherein each said ply turnup mechanism comprises an annular inflatable bladder, means for supporting said bladder in substantially flattened condition adjacent the respective ends of said drum when said bladder is deflated, and means for inflating said bladder to cause the edges of the tire plies to be turned up over the tire beads after the tire beads have been precisely positioned over the ends of the drum and the drum has been expanded into engagement with the tire beads.

14. The machine of claim 13 further comprising means for pressing said bladders when inflated toward the respective ends of said drum to the same extent to assist in obtaining the same amount of stitching and turnup of the plies on both sides of the tire, said last-mentioned means comprising pusher rings on said carriages which are moved axially inwardly with said carriages to the same extent for pressing against said bladders at the same time and to the same extent during continued axial inward movement of said carriages beyond the bead setting position when said gate means is moved out of the path of said stop nut means, such continued axial inward movement of said carriages during ply turnup being limited by engagement by said further safety stop with said stationary mounting plate.

15. In a tire building machine, an expandable tire building drum having tire bead carriers mounted for movement toward and away from opposite ends of said drum, means for expanding and contracting said drum, said tire bead carriers including means for supporting the tire beads radially outwardly of the drum ends when the drum is contracted, and means for synchronously moving said tire bead carriers symmetrically about the centerline of said drum to position the tire beads at the desired location over the ends of said drum and holding the tire beads in place during expansion of said drum, said means for synchronously moving said tire bead carriers symmetrically about the centerline of said drum comprising a pair of carriages for said tire bead carriers, means mounting said carriages for movement toward and away from opposite ends of said drum, a rack and pinion mechanism for synchronizing the movements of said carriages in opposite directions, and control means for moving said carriages to the desired extent for positioning the tire beads at the desired location over the ends of said drum and holding the tire beads in place during expansion of said drum as aforesaid, said rack and pinion mechanism comprising a stationary housing located intermediate said carriages, a pinion rotatably mounted in said housing, and a pair of racks engaging opposite sides of said pinion, one of said racks being connected to one of said carriages and the other of said racks being connected to the other of said carriages for causing said carriages to move axially toward and away from each other to the same extent, and means for moving said housing laterally with respect to the centerline of said carriages to insure proper axial alignment of said pinion therewith, said means for moving said housing laterally with respect to the centerline of said carriages comprising rotatable pins adjacent each side of said housing having eccentrics thereon, said eccentrics being received in bushings carried by mounting plates extending into slots in said housing, whereby rotation of said pins causes said eccentrics to rotate, forcing said housing laterally as aforesaid.

* * * * *